US008804118B2

(12) United States Patent
Shibayama et al.

(10) Patent No.: US 8,804,118 B2
(45) Date of Patent: *Aug. 12, 2014

(54) SPECTRAL MODULE

(75) Inventors: Katsumi Shibayama, Hamamatsu (JP);
Takafumi Yokino, Hamamatsu (JP);
Masaki Hirose, Hamamatsu (JP);
Masashi Ito, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 341 days.

This patent is subject to a terminal disclaimer.

(21) Appl. No.: 12/992,398

(22) PCT Filed: May 7, 2009

(86) PCT No.: PCT/JP2009/058617
§ 371 (c)(1),
(2), (4) Date: Feb. 10, 2011

(87) PCT Pub. No.: WO2009/139315
PCT Pub. Date: Nov. 19, 2009

(65) Prior Publication Data
US 2011/0164247 A1    Jul. 7, 2011

(30) Foreign Application Priority Data

May 15, 2008   (JP) .................. P2008-128687
Dec. 5, 2008   (JP) .................. P2008-311057

(51) Int. Cl.
*G01J 3/02*   (2006.01)
(52) U.S. Cl.
USPC ........................................... 356/328
(58) Field of Classification Search
USPC ........................................... 356/328
See application file for complete search history.

(56) References Cited

U.S. PATENT DOCUMENTS 4,259,014 A    3/1981   Talmi
4,644,632 A    2/1987   Machler et al.
(Continued)

FOREIGN PATENT DOCUMENTS

DE    197 17 015     10/1998
DE    19717014 A1    10/1998
(Continued)

OTHER PUBLICATIONS

"Combining MEMS technology with image sensor technology Newly developed "thumb sized" ultra compact spectroscope Started shipping samples of MS series "C10988MA(X), News Release, Hamamatsu Photonics K.K., URL, https://jp.hamamatsu.com/hamamatsu/press/2008/common/pdf/2008_08_28.pdf Aug. 28, 2008, p. 1-p. 4 (with attached partial English-language translation).

(Continued)

*Primary Examiner* — Tarifur Chowdhury
*Assistant Examiner* — Omar Nixon
(74) *Attorney, Agent, or Firm* — Drinker Biddle & Reath LLP

(57) ABSTRACT

A spectral module 1 comprises a substrate 2 for transmitting light L1 incident thereon from a front face 2a, a lens unit 3 for transmitting the light L1 incident on the substrate 2, a spectroscopic unit 4 for reflecting and spectrally resolving the light L1 incident on the lens unit 3, and a photodetector 5 for detecting light L2 reflected by the spectroscopic unit 4. The substrate 2 is provided with a recess 19 having a predetermined positional relationship with alignment marks 12a, 12b and the like serving as a reference unit for positioning the photodetector 5, while the lens unit 3 is mated with the recess 19. The spectral module 1 achieves passive alignment between the spectroscopic unit 4 and photodetector 5 when the lens unit 3 is simply mated with the recess 19.

9 Claims, 15 Drawing Sheets

(56) References Cited

U.S. PATENT DOCUMENTS

| | | |
|---|---|---|
| 5,995,221 A | 11/1999 | Slutter et al. |
| 6,081,331 A | 6/2000 | Teichmann |
| 6,249,346 B1 | 6/2001 | Chen et al. |
| 6,303,934 B1 | 10/2001 | Daly et al. |
| 6,538,736 B1 | 3/2003 | Palumbo |
| 6,608,679 B1 | 8/2003 | Chen et al. |
| 6,859,274 B2 | 2/2005 | Inamoto |
| 7,170,600 B2 | 1/2007 | Nishii et al. |
| 7,283,233 B1 | 10/2007 | Ho et al. |
| 7,576,855 B2 | 8/2009 | Tsukuda |
| 7,623,235 B2 | 11/2009 | Ho et al. |
| 7,697,137 B2 | 4/2010 | Comstock, II |
| 7,864,317 B2 | 1/2011 | Bockstaele et al. |
| 7,916,292 B2 | 3/2011 | Konno et al. |
| 8,040,507 B2 | 10/2011 | Shibayama |
| 8,045,158 B2 | 10/2011 | Shibayama |
| 8,068,223 B2 | 11/2011 | Suzuki et al. |
| 8,092,737 B2 | 1/2012 | Chang et al. |
| 8,351,032 B2 | 1/2013 | Grueger et al. |
| 2002/0060792 A1 | 5/2002 | Ibsen et al. |
| 2003/0197862 A1* | 10/2003 | Cohen et al. ............... 356/305 |
| 2004/0196458 A1 | 10/2004 | Shimizu et al. |
| 2004/0239931 A1* | 12/2004 | Teichmann et al. ......... 356/328 |
| 2005/0230844 A1 | 10/2005 | Kinsman |
| 2006/0023212 A1 | 2/2006 | Nishii et al. |
| 2006/0139636 A1 | 6/2006 | Kerstan et al. |
| 2006/0268269 A1 | 11/2006 | Warren |
| 2007/0211250 A1 | 9/2007 | Teichmann et al. |
| 2008/0123095 A1 | 5/2008 | Hubner et al. |
| 2008/0225291 A1 | 9/2008 | Konno et al. |
| 2008/0231852 A1 | 9/2008 | Shih et al. |
| 2009/0284741 A1 | 11/2009 | Shibayama et al. |
| 2009/0284742 A1 | 11/2009 | Shibayama |
| 2009/0284743 A1 | 11/2009 | Shibayama |
| 2009/0290154 A1 | 11/2009 | Shibayama et al. |
| 2009/0290155 A1 | 11/2009 | Shibayama et al. |
| 2009/0290164 A1 | 11/2009 | Shibayama et al. |
| 2010/0277730 A1 | 11/2010 | Kimura et al. |
| 2010/0277731 A1 | 11/2010 | Teramura et al. |
| 2010/0284084 A1 | 11/2010 | Ishibe |
| 2010/0315633 A1 | 12/2010 | Shibayama et al. |
| 2010/0315634 A1 | 12/2010 | Shibayama |
| 2011/0026022 A1 | 2/2011 | Takizawa et al. |
| 2011/0075143 A1 | 3/2011 | Shibayama et al. |
| 2011/0128541 A1 | 6/2011 | Grueger et al. |
| 2011/0141469 A1 | 6/2011 | Shibayama |
| 2013/0038874 A1 | 2/2013 | Shibayama et al. |

FOREIGN PATENT DOCUMENTS

| | | |
|---|---|---|
| EP | 0 489 286 | 6/1992 |
| FR | 2 847 978 | 6/2004 |
| JP | 4-287001 | 10/1992 |
| JP | 4-294223 | 10/1992 |
| JP | 6-167637 | 6/1994 |
| JP | 8-145794 | 6/1996 |
| JP | 2592081 | 1/1999 |
| JP | 2000-65642 | 3/2000 |
| JP | 2000-269472 | 9/2000 |
| JP | 2000-298066 | 10/2000 |
| JP | 2003-139611 | 5/2003 |
| JP | 2003-202463 | 7/2003 |
| JP | 2003-243444 | 8/2003 |
| JP | 2004-053992 | 2/2004 |
| JP | 2004-191246 | 7/2004 |
| JP | 2004-309146 | 11/2004 |
| JP | 2004-354176 | 12/2004 |
| JP | 2004-537750 | 12/2004 |
| JP | 2005-308495 | 11/2005 |
| JP | 2006-030031 | 2/2006 |
| JP | 2006-032561 | 2/2006 |
| JP | 2006032561 | 2/2006 |
| JP | 2006-098428 | 4/2006 |
| JP | 2007-199540 | 8/2007 |
| JP | 2008-098367 | 4/2008 |
| WO | WO 99/29103 | 6/1999 |
| WO | WO 2004/082023 | 9/2004 |
| WO | WO 2008/029852 | 3/2008 |
| WO | 2008/149940 | 12/2008 |
| WO | WO 2008/149939 | 12/2008 |
| WO | WO 2008/149944 | 12/2008 |
| WO | WO 2009/139321 | 11/2009 |
| WO | WO 2009/139326 | 11/2009 |
| WO | WO 2009/139327 | 11/2009 |

OTHER PUBLICATIONS

H.W. Teichmann et al., "A Replicated Micro-Optical Sensor for Industrial Spectral Analysis", tm-Technisches Messen, vol. 68, No. 5, May 2001, pp. 200-203, with partial English translation.
U.S. Appl. No. 12/992,428, filed Feb. 23, 2011, Shibayama.
U.S. Appl. No. 12/992,445, filed Feb. 2, 2011, Shibayama.
U.S. Appl. No. 12/992,412, filed Feb. 28, 2011, Shibayama.
U.S. Appl. No. 12/992,469, filed Feb. 8, 2011, Shibayama.
Loewen E G et al, "Review Articles; Different gratings for spectroscopy", Journal of Physics E. Scientific Instruments, IOP Publishing, Bristol, GB, vol. 3, No. 12, Dec. 1, 1970, p. 953-961, XP0200 19580.

* cited by examiner

SPECTRAL MODULE

TECHNICAL FIELD

The present invention relates to a spectral module for spectrally resolving and detecting light.

BACKGROUND ART

As conventional spectral modules,, those described in Patent Literatures 1 to 3 have been known, for example. Patent Literature 1 discloses a spectral module having a block-shaped support which is a biconvex lens, in which one convex surface of the support is provided with a spectroscopic unit such as a diffraction grating, while a photodetector such as a photodiode is disposed on the other convex surface side of the support.

CITATION LIST

Patent Literature

Patent Literature 1: Japanese Patent Application Laid-Open No. 4-294223
Patent Literature 2: Japanese Patent Application Laid-Open No. 2000-65642
Patent Literature 3: Japanese Patent Application Laid-Open No. 2004-354176

SUMMARY OF INVENTION

Technical Problem

Meanwhile, when positioning the spectroscopic unit and photodetector and attaching them to the support, the spectral module described in Patent Literature 1 necessitates so-called active alignment in which, while the light spectrally resolved by the spectroscopic unit is received by the photodetector, the spectroscopic unit is moved relative to the photodetector, and the spectroscopic unit and the photodetector are positioned with respect to each other according to the light-receiving state of the photodetector. However, such active alignment is problematic in that an operation for assembling the spectral module takes a long time.

In view of such circumstances, it is an object of the present invention to provide a spectral module which can be assembled easily while keeping reliability.

Solution to Problem

For achieving the above-mentioned object, the spectral module in accordance with the present invention comprises a substrate for transmitting light incident thereon from one surface; a light transmitting unit, disposed on the other surface side of the substrate, for transmitting the light incident on the substrate; a spectroscopic unit, formed with the light transmitting unit, for reflecting and spectrally resolving the light incident on the light transmitting unit; and a photodetector, disposed on the one surface side of the substrate, for detecting the light spectrally resolved by the spectroscopic unit; wherein the other surface is provided with a recess, adapted to mate with the light transmitting unit through an optical resin agent, having a predetermined positional relationship with a reference unit for positioning the photodetector with respect to the substrate; wherein the recess is provided with a first mating section adapted to mate with the light transmitting unit in an extending direction of a grating groove of the spectroscopic unit and a second mating section adapted to mate with the light transmitting unit in a direction substantially orthogonal to the extending direction of the grating groove; and wherein the second mating section and the light transmitting unit have a gap therebetween smaller than that between the first mating section and the light transmitting unit.

In this spectral module, since the recess has a predetermined positional relationship with the reference unit for positioning the photodetector with respect to the substrate, the spectroscopic unit and the light transmitting unit are positioned with respect to the substrate when the light transmitting unit formed with the spectroscopic unit is simply mated with the recess. Here, the photodetector is positioned with respect to the substrate by the reference unit, whereby alignment is achieved between the spectroscopic unit and the photodetector. In addition, the gap between the mating section and the light transmitting unit in a direction substantially orthogonal to the extending direction of the grating groove of the spectroscopic unit is smaller than that between the mating section and the light transmitting unit in the extending direction of the grating groove of the spectroscopic unit. This achieves the alignment between the light transmitting unit and the photodetector precisely in a direction substantially orthogonal to the extending direction of the grating groove, whereby the light spectrally resolved by the spectroscopic unit can be made accurately incident on the photodetector. When bonding the light transmitting unit to the substrate with the optical resin agent, an excess of resin and air can effectively be released, since the gap between the light transmitting unit and the mating section is formed greater in the extending direction of the grating groove. This spectral module thus achieves so-called passive alignment, which can make it easy to assemble while keeping reliability.

Preferably, in the spectral module in accordance with the present invention, the recess has a side wall including a spaced section deviating from the first and second mating sections and the light transmitting unit. Such a structure can release the excess of resin and air more effectively through the gap between the light transmitting unit and the spaced section when bonding the light transmitting unit to the substrate with the optical resin agent. This can suppress unevenness in the resin agent and occurrence of bubbles between the light transmitting unit and the substrate, thereby making it possible to mount the light transmitting unit more precisely to the substrate.

Preferably, the spaced section comprises a plurality of sections disposed so as to surround the light transmitting unit. This structure can release the excess of resin and air through a plurality of gaps more efficiently when bonding the light transmitting unit to the substrate with the optical resin agent.

In another aspect, the spectral module in accordance with the present invention comprises a substrate for transmitting light incident thereon from one surface; a light transmitting unit, disposed on the other surface side of the substrate, for transmitting the light incident on the substrate; a spectroscopic unit, formed with the light transmitting unit, for reflecting and spectrally resolving the light incident on the light transmitting unit; and a photodetector, disposed on the one surface side of the substrate, for detecting the light spectrally resolved by the spectroscopic unit; wherein the other surface is provided with a recess having a predetermined positional relationship with a reference unit for positioning the photodetector with respect to the substrate; and wherein the light transmitting unit is mated with the recess.

In this spectral module, since the recess has a predetermined positional relationship with the reference unit for positioning the photodetector with respect to the substrate, the spectroscopic unit and the light transmitting unit are positioned with respect to the substrate when the light transmitting unit formed with the spectroscopic unit is simply mated with the recess. Here, the photodetector is positioned with respect to the substrate by the reference unit, whereby alignment is achieved between the spectroscopic unit and the photodetector. This spectral module thus achieves so-called passive alignment, which can make it easy to assemble while keeping reliability.

In still another aspect, the spectral module in accordance with the present invention comprises a main unit for transmitting light incident thereon from one surface side; a spectroscopic unit, formed with the main unit, for reflecting and spectrally resolving the light incident on the main unit; and a photodetector, disposed on the one surface side of the main unit, for detecting the light spectrally resolved by the spectroscopic unit; wherein the one surface is provided with a recess, adapted to mate with the photodetector through an optical resin agent, having a predetermined positional relationship with a reference unit for positioning the spectroscopic unit with respect to the main unit; wherein the recess is provided with a third mating section adapted to mate with the photodetector in an extending direction of a grating groove of the spectroscopic unit and a fourth mating section adapted to mate with the photodetector in a direction substantially orthogonal to the extending direction of the grating groove; and wherein, the fourth mating section and the photodetector have a gap therebetween smaller than that between the third mating section and the photodetector.

In this spectral module, since the recess has a predetermined positional relationship with the reference unit for positioning the spectroscopic unit with respect to the main unit, the photodetector is positioned with respect to the main unit when the photodetector is simply mated with the recess. Here, the spectroscopic unit is positioned with respect to the main unit by the reference unit, whereby alignment is achieved between the spectroscopic unit and the photodetector. In addition, the gap between the mating section and the photodetector in a direction substantially orthogonal to the extending direction of the grating groove of the spectroscopic unit is smaller than that between the mating section and the photodetector in the extending direction of the grating groove of the spectroscopic unit. This achieves the alignment between the main unit and the photodetector precisely in a direction substantially orthogonal to the extending direction of the grating groove, whereby the light spectrally resolved by the spectroscopic unit can be made accurately incident on the photodetector. When bonding the photodetector to a substrate with the optical resin agent, an excess of resin and air can effectively be released, since the gap between the photodetector and the mating section is formed greater in the extending direction of the grating groove. This spectral module thus achieves so-called passive alignment, which can make it easy to assemble while keeping reliability.

Preferably, in the spectral module in accordance with the present invention, the photodetector has an elongated form such as to be longer in a direction substantially orthogonal to the extending direction of the grating groove than in the extending direction of the grating groove. This structure makes the gap between the mating section and the photodetector longer and the distance to the gap shorter in the extending direction of the grating groove than in a direction substantially orthogonal to the extending direction of the grating groove, whereby the excess of resin and air can be moved efficiently to the gap.

Preferably, in the spectral module in accordance with the present invention, the photodetector projects from the one surface while mating with the recess. This structure can not only make it easier to mate the photodetector with the recess disposed in one surface of the substrate, but also reliably press the photodetector against the bottom face of the recess, thereby securely releasing the excess of resin and air.

Preferably, in the spectral module in accordance with the present invention, the photodetector is provided with a light transmitting hole for transmitting light proceeding to the spectroscopic unit. This structure can achieve passive alignment of the light transmitting hole with respect to the spectroscopic unit and photodetector.

Advantageous Effects of Invention

The present invention makes it possible to assemble a spectral module easily white keeping the reliability of the spectral module.

DESCRIPTION OF EMBODIMENTS

Figure 1:
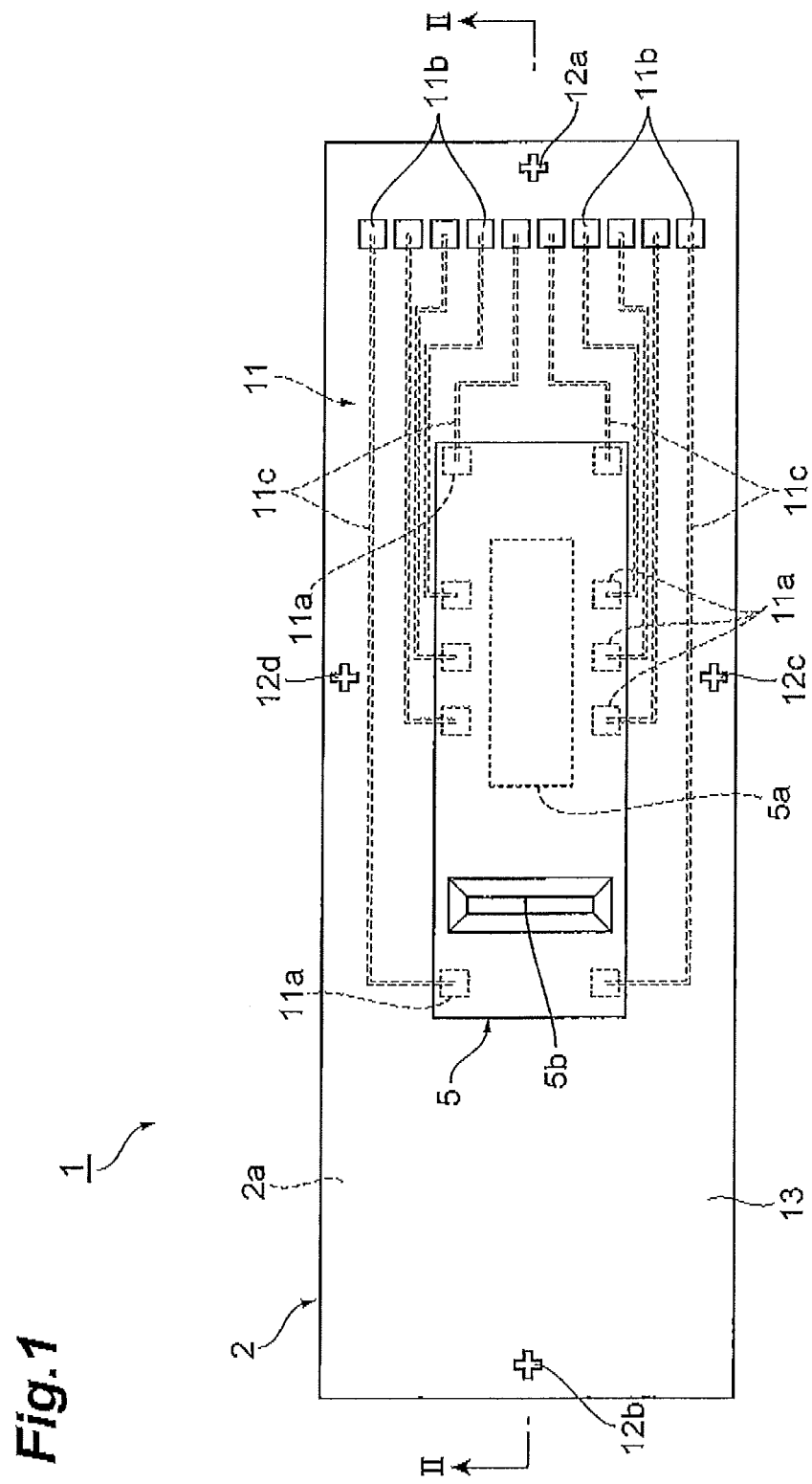
[FIG. 1] is a plan view of a first embodiment of the spectral module in accordance with the present invention.

In the following, preferred embodiments of the present invention will be explained in detail with reference to the drawings. In the drawings, the same or equivalent parts will be referred to with the same signs while omitting their overlapping descriptions.

[First Embodiment]

Figure 2:
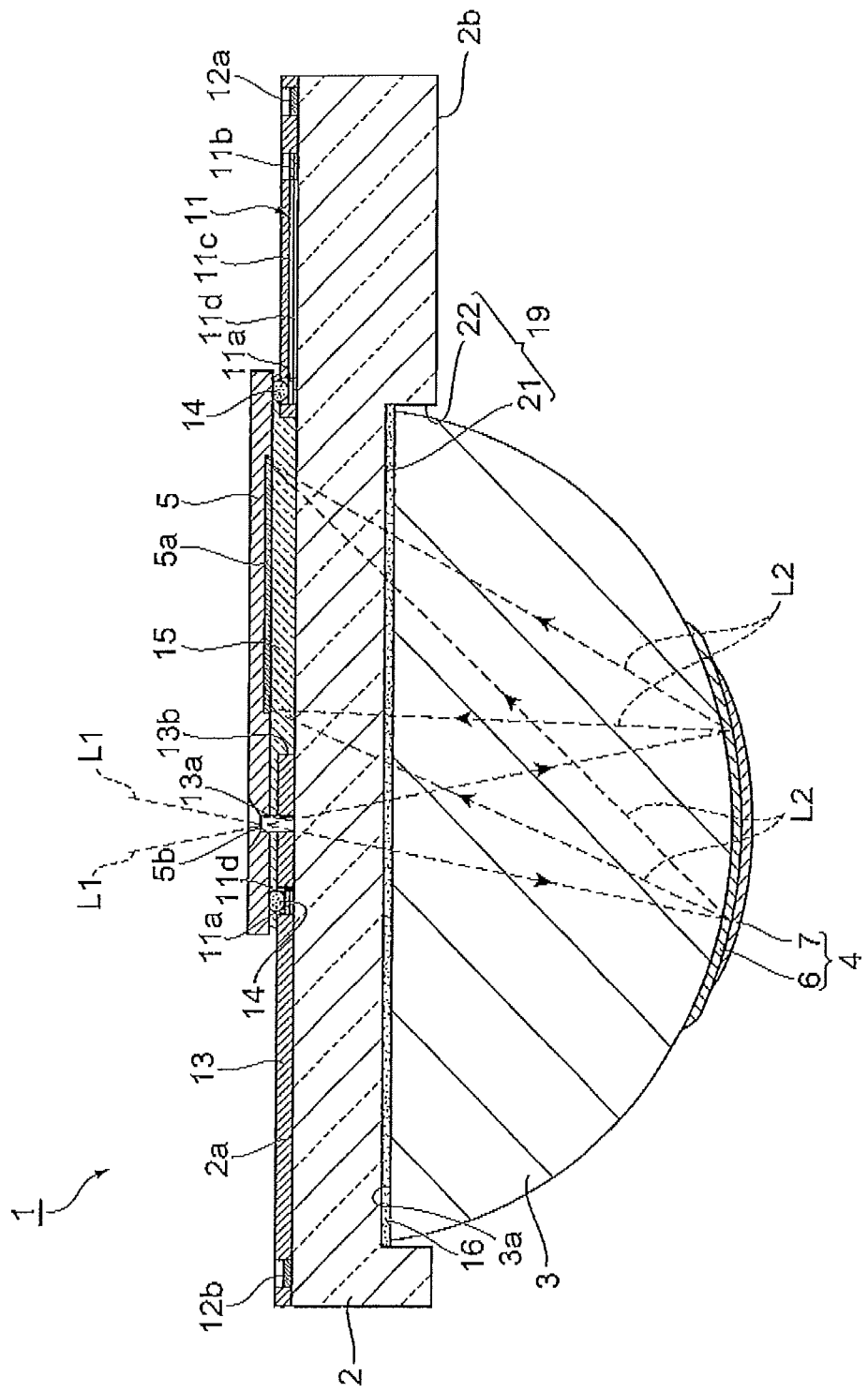
[FIG. 2] is a sectional view taken along the line of FIG. 1.

FIG. 1 is a plan view of the first embodiment of the spectral module in accordance with the present invention, while FIG. 2 is a sectional view taken along the line II-II of FIG. 1. As illustrated in FIGS. 1 and 2, this spectral module 1 comprises a substrate 2 for transmitting light L1 incident thereon from its front face (one surface) 2a, a lens unit (light transmitting unit) 3 for transmitting the light L1 incident on the substrate 2, a spectroscopic unit 4 for reflecting and spectrally resolving the light L1 incident on the lens unit 3, and a photodetector 5 for detecting light L2 reflected by the spectroscopic unit 4. The spectral module 1 is a microspectral module which spectrally resolves the light L1 into the light L2 corresponding to a plurality of wavelengths with the spectroscopic unit 4 and detects the light L2 with the photodetector 5, thereby measuring the wavelength distribution, strength of a specific wavelength component, and the like of the light L1.

The substrate 2 is formed into an rectangular plate (e.g. with a full length of 15 to 20 mm, a full width of 11 to 12 mm, and a thickness of 1 to 3 mm) from any of light transmitting glass materials such as BK7, Pyrex (registered trademark), and silica, plastics, and the like. Formed on the front face 2a of the substrate 2 is a wiring pattern 11 made of a monolayer film of Al, Au, or the like or a multilayer film of Cr—Pt—Au, Ti—Pt—Au, Ti—Ni—Au, Cr—Au, or the like. The wiring pattern 11 has a plurality of pad parts 11a arranged at the center portion of the substrate 2, a plurality of pad parts 11b arranged at one end portion in the longitudinal direction of the substrate 2, and a plurality of connection parts 11c for connecting the corresponding pad parts 11a and 11b to each other. The wiring pattern 11 also has an reflecting layerantireflecting layer 11d made of a monolayer film of CrO or the like or a multilayer film of Cr—CrO or the like on the front face 2a side of the substrate 2.

Further, cross-shaped alignment marks (reference units) 12a, 12b, 12c, 12d for positioning the photodetector 5 with respect to the substrate 2 are formed in the front face 2a of the substrate 2 by a structure similar to that of the wiring pattern 11. The alignment marks 12a, 12b are formed at both end portions in the longitudinal direction of the substrate 2, respectively, each arranged at the center position in a direction substantially orthogonal to the longitudinal direction of the substrate 2. The alignment marks 12c, 12d are formed at both end portions in a direction substantially orthogonal to the longitudinal direction of the substrate 2, respectively, each arranged at the center position in the longitudinal direction of the substrate 2.

Figure 3:
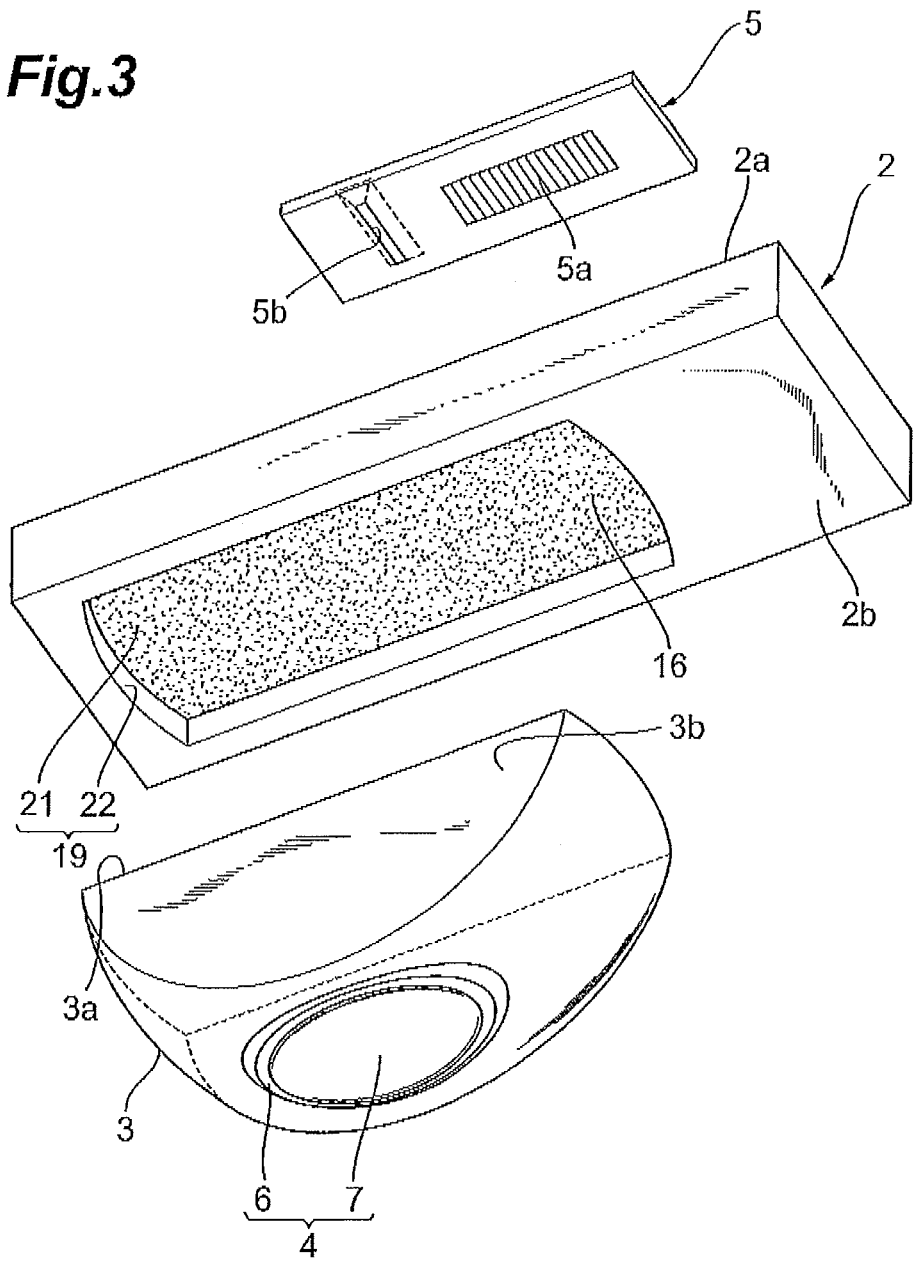
[FIG. 3] is an exploded perspective view of the spectral module of FIG. 1.
Figure 4:
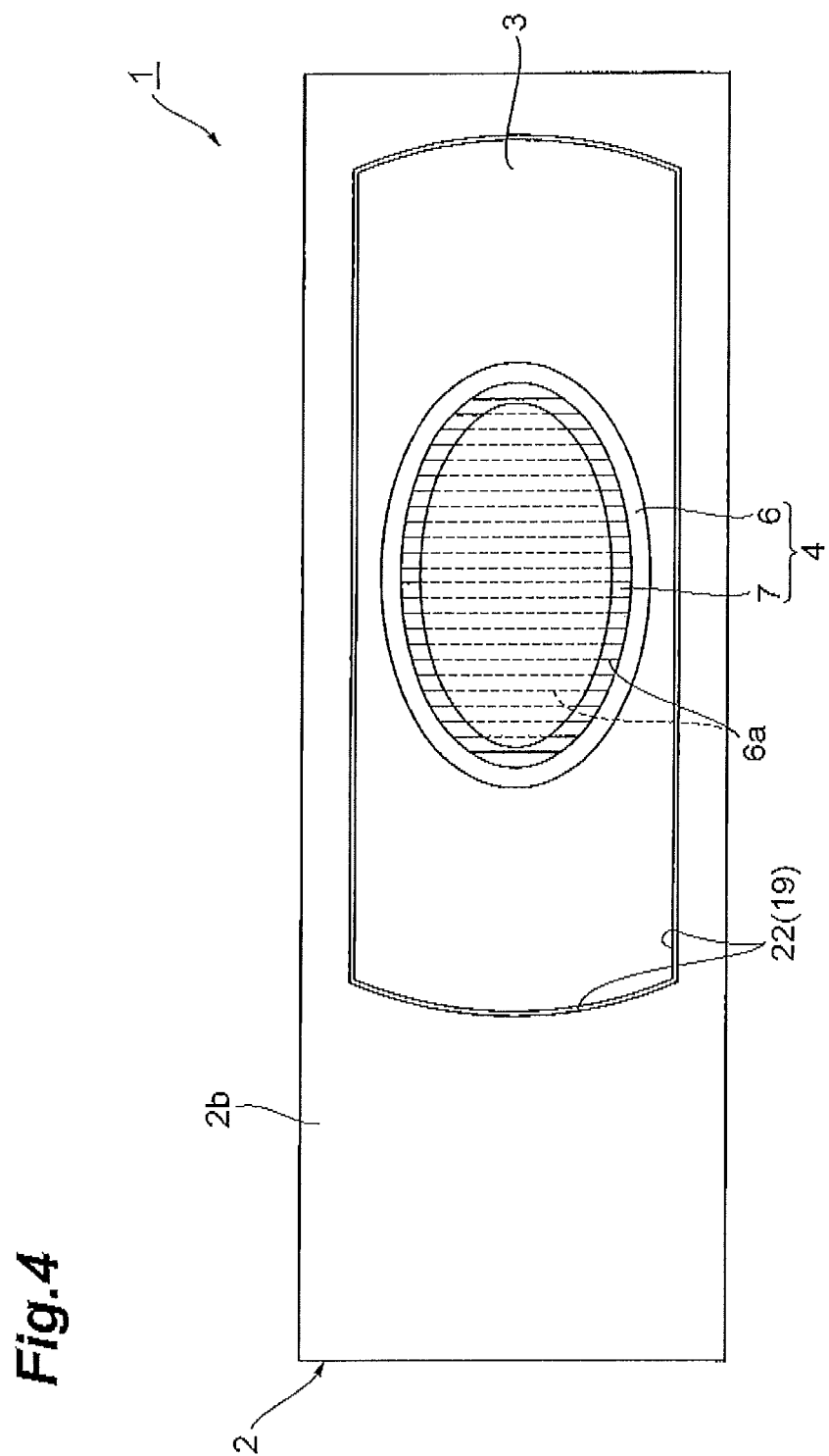
[FIG. 4] is a bottom plan view of the spectral module of FIG. 1.

FIG. 3 is an exploded perspective view of the spectral module of FIG. 1. while FIG. 4 is a bottom plan view of the spectral module of FIG. 1. As illustrated in FIGS. 3 and 4, the rear face (the other surface) 2b of the substrate 2 is provided with a recess 19 adapted to mate with the lens unit 3. The recess 19 comprises a bottom face 21 substantially parallel to the rear face 2b of the substrate 2 and a side wall (constituted by first mating sections (side walls opposing each other in the extending direction of grating grooves 6a which will be explained later) and second mating sections (side walls opposing each other in a direction substantially orthogonal to the extending direction of the grating grooves 6a that will be explained later)) 22 and is formed by etching such as to have a predetermined positional relationship with the alignment marks 12a, 12b, 12c, 12d. The recess 19 is produced such that the gap formed between the lens unit 3 and the side wall 22 in the longitudinal direction of the substrate 2 is smaller than that formed between the lens unit 3 and the side wall 22 in a direction substantially orthogonal to the longitudinal direction of the substrate 2 (e.g., the gap formed in a direction substantially orthogonal to the longitudinal direction of the substrate 2 is 0 to 100 μm, while the gap formed in the longitudinal direction of the substrate 2 is 0 to 30 μm).

Figure 5:
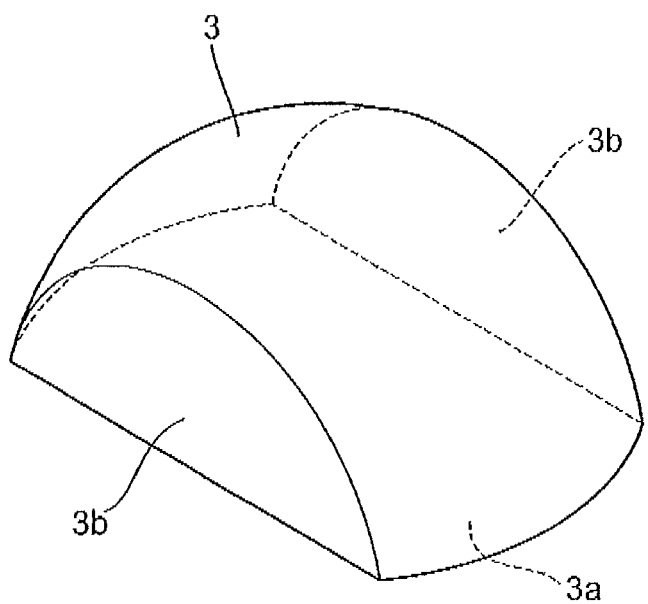
[FIG. 5] is a perspective view of a lens unit in the spectral module of FIG. 1.

FIG. 5 is a perspective view of the lens unit in the spectral module of FIG. 1. As illustrated in FIG. 5, the lens unit 3 is made of the same material as that of the substrate 2, a light transmitting resin, a light transmitting inorganic/organic hybrid material, a light transmitting low melting glass material, a plastic, or the like into such a form (e.g., with a radius of curvature of 6 to 10 mm, a full length in a bottom face 3a of 12 to 18 mm, a full width in the bottom face 3a (i.e., the distance between side faces 3b) of 6 to 10 mm, and a height of 5 to 8 mm) that a semispherical lens is cut at two planes substantially parallel to each other and substantially orthogonal to the bottom face 3a, so as to form the side faces 3b, and functions as a lens for converging the light L2 spectrally resolved by the spectroscopic unit 4 onto a light detecting unit 5a of the photodetector 5. The lens form is not limited to a spherical lens, but may be an aspherical lens as well.

As illustrated in FIGS. 2 and 3, the lens unit 3 is mated with the recess 19 through an optical resin agent 16. That is, the lens unit 3 is arranged on the rear face 2b side of the substrate 2. Specifically, the lens unit 3 is mated with the recess 19 such that gaps are formed between the lens unit 3 and the side wall 22 of the recess 19, while the optical resin agent 16 is disposed in these gaps and between the bottom face 3a of the lens unit 3 and the bottom face 21 of the recess 19.

As illustrated in FIGS. 2 to 4, the spectroscopic unit 4 is a reflection type grating having a diffracting layer 6 formed on the outer surface of the lens unit 3 and a reflecting layer 7 formed on the outer surface of the diffracting layer 6. The diffracting layer 6 is formed by aligning a plurality of grating grooves 6a in a row longitudinally of the substrate 2, while the extending direction of the grating grooves 6a substantially coincides with a direction substantially orthogonal to the longitudinal direction of the substrate 2. While employing a blazed grating having a sawtooth cross section, a binary grating having a rectangular cross section, a holographic grating having a sinusoidal cross section, or the like, for example, the diffracting layer 6 is formed by photocuring a replicating optical resin such as photocurable epoxy, acrylic, and organic/inorganic hybrid resins. The reflecting layer 7 is shaped like a film and formed by vapor-depositing Al, Au, or the like on the outer surface of the diffracting layer 6, for example, Regulating the area by which the reflecting layer 7 is formed can adjust the optical NA of the spectral module 1. The lens unit 3 and the diffracting layer 6 constituting the spectroscopic unit 4 can also be integrally formed by the materials mentioned above.

As illustrated in FIGS. 1 and 2, the photodetector 5 is formed into an rectangular plate (e.g., with a full length of 5 to 10 mm, a full width of 1.5 to 3 mm, and a thickness of 0.1 to 0.8 mm). The light detecting unit 5a of the photodetector 5 is a CCD image sensor, a PD array, a CMOS image sensor, or the like, in which a plurality of channels are arranged in a row in a direction (i.e., the direction of the row of the grating grooves 6a) substantially orthogonal to the extending direction of the grating grooves 6a of the spectroscopic unit 4.

When the light detecting unit 5a is a CCD image sensor, the intensity information of light at its incident position on two-dimensionally arranged pixels is subjected to line binning, so as to yield light intensity information at one-dimensional positions, and the intensity information at the one-dimensional positions is read in time series. That is, a line of pixels subjected to line binning forms one channel. In the case where the light detecting unit 5a is a PD array or CMOS image sensor, intensity information of light at its incident position on one-dimensionally arranged pixels is read in time series, whereby one pixel forms one channel.

When the light detecting unit 5a is a PD array or CMOS image sensor in which pixels are arranged two-dimensionally, a line of pixels aligning in a one-dimensional arrangement direction parallel to the extending direction of the grating grooves 6a of the spectroscopic unit 4 forms one channel. When the light detecting unit 5a is a CCD image sensor, one having a channel interval in the arrangement direction of 12.5 µm, a channel full length (length of the one-dimensional pixel row subjected to line binning) of 1 mm, and 256 arrangement channels, for example, is used for the photodetector 5.

The photodetector 5 is also formed with a light transmitting hole 5b, disposed in parallel with the light detecting unit 5a in the channel arrangement direction, for transmitting the light L1 proceeding to the spectroscopic unit 4. The light transmitting hole 5b, which is a slit (e.g., with a length of 0.5 to 1 mm and a width of 10 to 100 µm) extending in a direction substantially orthogonal to the longitudinal direction of the substrate 2, is formed by etching or the like while being positioned with respect to the light detecting unit 5a with a high precision.

Also, a light absorbing layer 13 is formed on the front face 2a of the substrate 2 such as to expose the pad parts 11a, 11b of the wiring pattern 11 and the alignment marks 12a, 12b, 12c, 12d and cover the connection parts 11c of the wiring pattern 11. The light absorbing layer 13 is formed with a slit 13a at a position opposing the light transmitting hole 5b of the photodetector 5 so as to transmit the light L1 proceeding to the spectroscopic unit 4 and an opening 13b at a position opposing the light detecting unit 5a so as to transmit the light L2 proceeding to the light detecting unit 5a of the photodetector 5. The light absorbing layer 13 is patterned into a predetermined form and integrally shaped by CrO, a multilayer film containing CrO, a black resist, or the like.

By facedown bonding through bumps 14, outer terminals of the photodetector 5 are electrically connected to their corresponding pad parts 11a exposed from the light absorbing layer 13. The pad parts 11b are electrically connected to external electric elements (not depicted). An underfill material 15 which transmits at least the light L2 fills the space on the substrate 2 side of the photodetector 5 (between the photodetector 5 and the substrate 2 or light absorbing layer 13 here), whereby a mechanical strength can be kept.

A method of manufacturing the above-mentioned spectral module 1 will now be explained.

First, the wiring pattern 11 and alignment marks 12a, 12b, 12c, 12d are patterned on the front face 2a of the substrate 2. Thereafter, the light absorbing layer 13 is patterned such as to expose the pad parts 11a, 11b and alignment marks 12a, 12b, 12c, 12d and form the slit 13a and opening 13b, The light absorbing layer 13 is formed by photolithography so as to be in alignment. The recess 19 is formed in the rear face 2b of the substrate 2 by photolithography and etching utilizing a double-sided alignment and exposure system or the like such as to have a predetermined positional relationship with the alignment marks 12a, 12b, 12c, 12d formed in the front face 2a.

The photodetector 5 is mounted on the light absorbing layer 13 by face-down bonding. Here, the photodetector 5 is arranged such that the channel arrangement direction of the light detecting unit 5a substantially coincides with the longitudinal direction of the substrate 2, while the light detecting unit 5a faces the front face 2a of the substrate 2, and mounted at a predetermined position with reference to the alignment marks 12a, 12b, 12c, 12d by image recognition.

On the other hand, the spectroscopic unit 4 is formed on the lens unit 3, First, a light transmitting master grating (not depicted) inscribed with a grating corresponding to the diffracting layer 6 is brought into contact with a replicating optical resin dropped near the vertex of the lens unit 3. Subsequently, while in contact with the master grating, the replicating optical resin is hardened by irradiation with light, so as to form the diffracting layer 6 having a plurality of grating grooves 6a extending in a direction substantially orthogonal to the longitudinal direction of the substrate 2. Preferably, after being hardened, the layer is stabilized by heat curing. When the replicating optical resin is hardened, the master grating is released therefrom, and aluminum or gold is vapor-deposited on the outer face of the diffracting layer 6 through a mask or as a whole, so as to form the reflecting layer 7.

Next, the photocurable optical resin agent 16 is applied to the recess 19 of the substrate 2. Then, the bottom face 3a side of lens unit 3 is mated with the recess 19. Here, the lens unit 3 is mated therewith such that the extending direction of the grating grooves 6a of the spectroscopic unit 4 substantially coincides with a direction substantially orthogonal to the longitudinal direction of the substrate 2, while the an excess of the resin agent and air is released through the gap between the lens unit 3 and the side wall 22 of the recess 19. Thereafter, the optical resin agent 16 is hardened by irradiation with light, so as to mount the lens unit 3 to the substrate 2.

Operations and effects of the above-mentioned spectral module 1 will now be explained.

In this spectral module 1, since the recess 19 has a predetermined positional relationship with the alignment marks 12a, 12b, 12c, 12d for positioning the photodetector 5 with respect to the substrate 2, the spectroscopic unit 4 and the lens unit 3 are positioned with respect to the substrate 2 when the lens unit 3 formed with the spectroscopic unit 4 is simply mated with the recess 19. Also, since the photodetector 5 is positioned with respect to the substrate 2 by the alignment marks 12a, 12b, 12c, 12d in the spectral module 1, positioning the spectroscopic unit 4 with respect to the substrate 2 results in alignment between the spectroscopic unit 4 and the photodetector 5. Therefore, this spectral module 1 achieves so-called passive alignment, which can make it easier to assemble the spectral module.

In this spectral module 1, the recess 19 is formed such that the gap between the side wall 22 and the lens unit 3 is smaller in a direction substantially coinciding with a direction (i.e., the longitudinal direction of the substrate 2) substantially orthogonal to the extending direction of the grating grooves 6a than in the extending direction of the grating grooves 6a (i.e., a direction substantially orthogonal to the longitudinal direction of the substrate 2). Therefore, in this spectral module 1, the alignment between the lens unit 3 and photodetector 5 is effected precisely in a direction substantially orthogonal to the extending direction of the grating grooves 6a, so that the light L2 spectrally resolved by the spectroscopic unit 4 can accurately be made incident on the photodetector 5, whereby the reliability of the spectral module can be improved. Since the channel (pixel line) arrangement direction in the photodetector 5 and the longitudinal direction of the substrate 2 substantially coincide with each other in this spectral module 1, the alignment between the lens unit 3 and photodetector 5 is effected precisely in the channel arrangement direction (i.e., a direction substantially orthogonal to the extending direction of the grating grooves 6a). Hence, in this spectral module 1, the light L2 spectrally resolved by the spectroscopic unit 4 is incident on an appropriate channel without deviating in the channel arrangement direction (channel width direction), whereby the reliability of the spectral module can effectively be improved.

Also, in the spectral module 1, the gap between the lens unit 3 and side wall 22 is formed greater in the extending direction of the grating grooves 6a, whereby the excess of resin and air can effectively be released through the gap in the extending direction of the grating grooves 6a when bonding the lens unit 3 to the substrate 2 with the optical resin agent. Therefore, this spectral module 1 can suppress unevenness in the optical resin agent 16 and occurrence of bubbles between the lens unit 3 and substrate 2 (i.e., between the lens unit 3 and recess 19), thereby making it possible to mount the lens unit 3 precisely to the substrate 2.

The present invention is not limited to the above-mentioned first embodiment.

Figure 6:
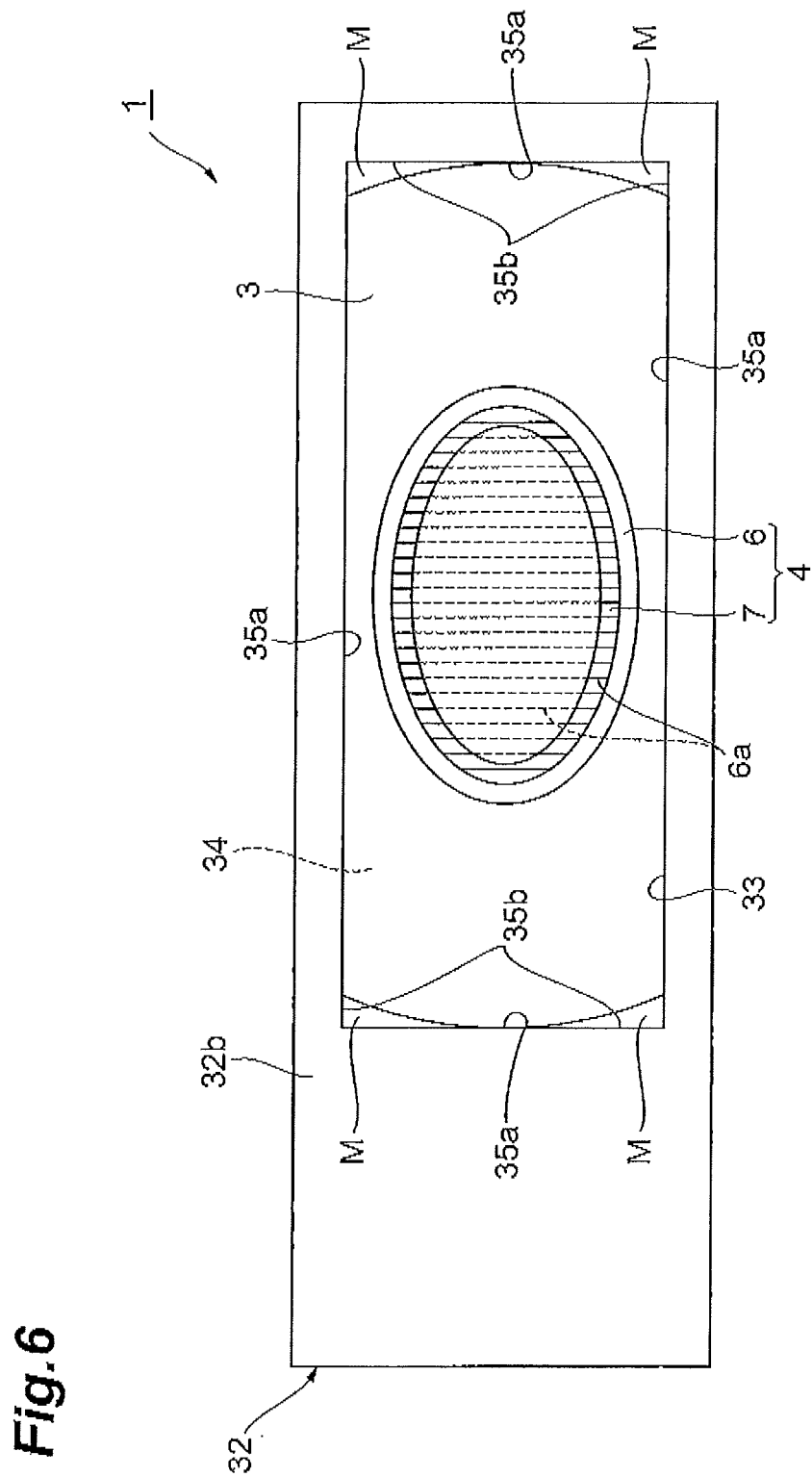
[FIG. 6] is a bottom plan view of another embodiment of the spectral module in accordance with the present invention.

For example, as illustrated in FIG. 6, a recess 33 may comprise an rectangular bottom face 34 substantially parallel to a rear face 32b of a substrate 32 and a side wall 35 substantially perpendicular to the bottom face 34, while the side wall 35 may have mating sections 35a adapted to mate with the lens unit 3 in the longitudinal direction of the substrate 32 and a direction substantially orthogonal to the longitudinal direction and spaced sections 35b deviating from the lens unit 3. In this case, when mounting the lens unit 3 to the substrate 32, the excess of resin and air can be released through gaps M formed between the lens unit 3 and the spaced sections 35b, so that the lens unit 3 can be fixed reliably while the resin between the lens unit 3 and bottom face 34 can attain a substantially uniform thickness without causing unevenness in the resin or generating bubbles between the lens unit 3 and substrate 32, whereby the lens unit 3 can be mounted to the substrate 32 with a high horizontal precision.

Figure 7:
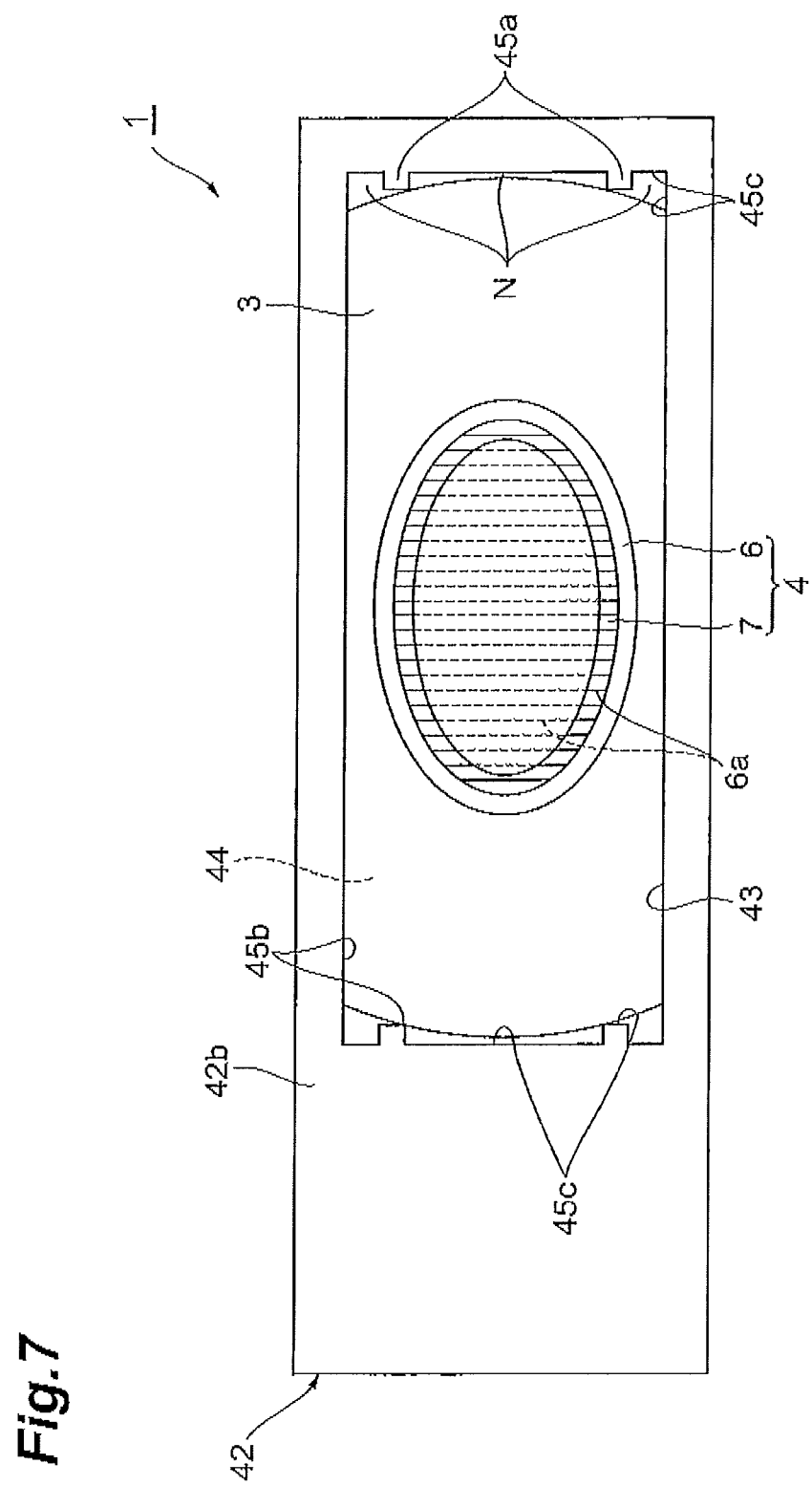
[FIG. 7] is a bottom plan view of still another embodiment of the spectral module in accordance with the present invention.

As illustrated in FIG. 7, a recess 43 may comprise an essentially rectangular bottom face 44 substantially parallel to a rear face 42b of a substrate 42 and a side wall 45 substantially perpendicular to the bottom face 44, while the side wall 45 may have mating sections 45b, which include a part of two pairs of projections 45a projecting to the inside of the recess 43 longitudinally of the substrate 42 and are adapted to mate with the lens unit 3 in the longitudinal direction of the substrate 42 and a direction substantially orthogonal to the longitudinal direction, and spaced sections 45c deviating from the lens unit 3. In this case, since the mating sections 45b include a part of the projections 45a projecting to the inside of the recess 43, gaps N between the lens unit 3 and spaced sections 45c are formed greater than those in the second embodiment, whereby the excess of resin and air can be released effectively when mounting the lens unit 3 to the substrate 42.

As illustrated in FIGS. 6 and 7, a plurality of spaced sections may be disposed so as to surround the lens unit 3. Since a plurality of gaps are formed between the lens unit 3 and the spaced sections so as to surround the lens unit 3, this structure can efficiently release the excess of resin and air through the plurality of gaps surrounding the lens unit 3 when bonding the lens unit 3 to the substrate with the optical resin agent.

The recess illustrated in FIGS. 6 and 7 may be formed such that the gap between the lens unit 3 and the side face of the recess in a direction substantially coinciding with the longitudinal direction of the substrate is smaller than that in a direction substantially orthogonal to the longitudinal direction of the substrate. This can release the excess of resin and air more effectively.

The recess may be formed on the substrate by a resin such as a resist or a metal mask instead of etching the substrate.

The reference unit is not limited to the alignment marks 12a, 12b, 12c, 12d; for example, the recess 19 and photodetector 5 may be positioned with respect to each other while utilizing the wiring pattern 11 as the reference unit. Corner portions in the outer shape of the substrate 2 may also be employed as the reference unit, for example.

[Second Embodiment]

Figure 8:
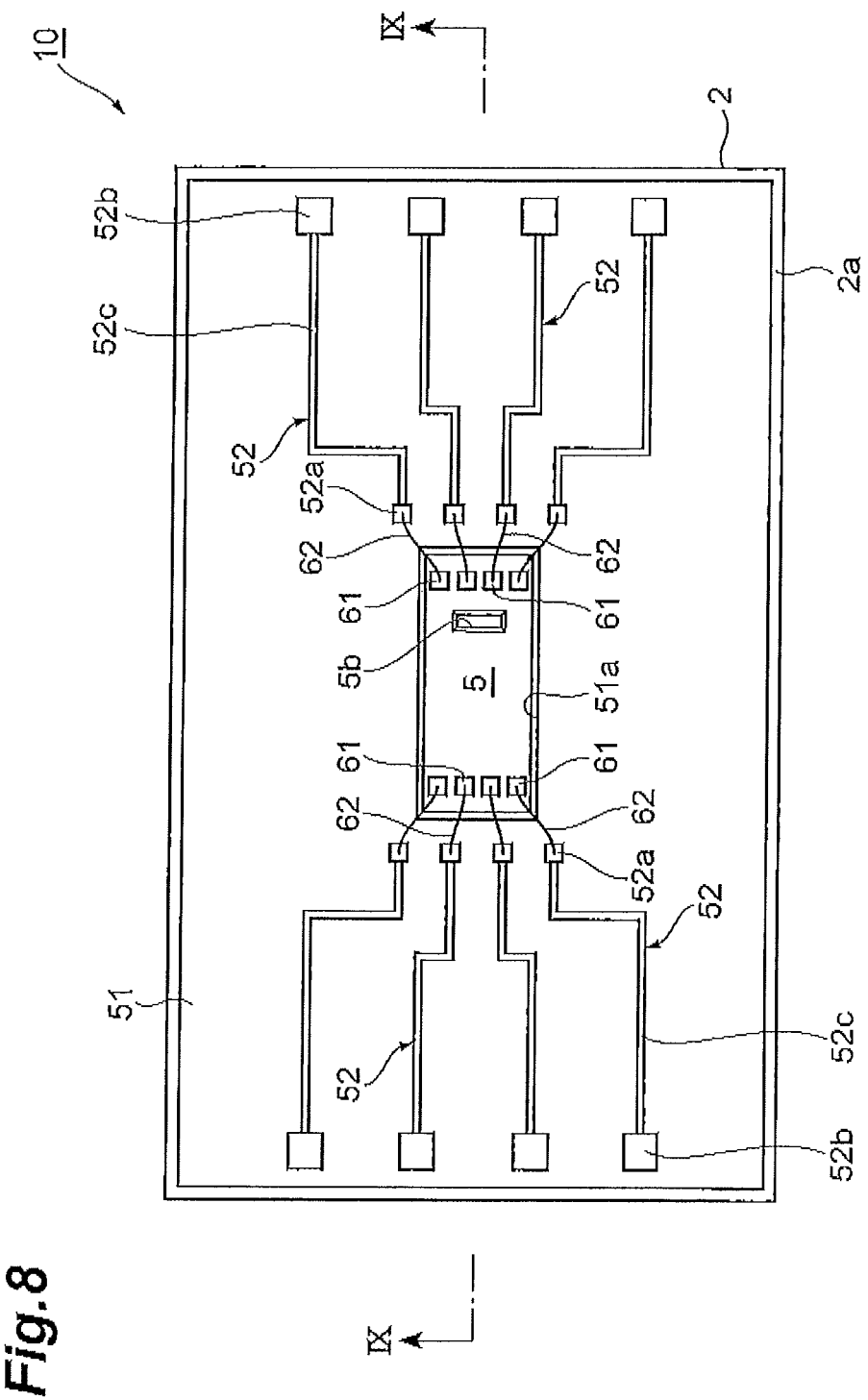
[FIG. 8] is a plan view of a second embodiment of the spectral module in accordance with the present invention.
Figure 9:
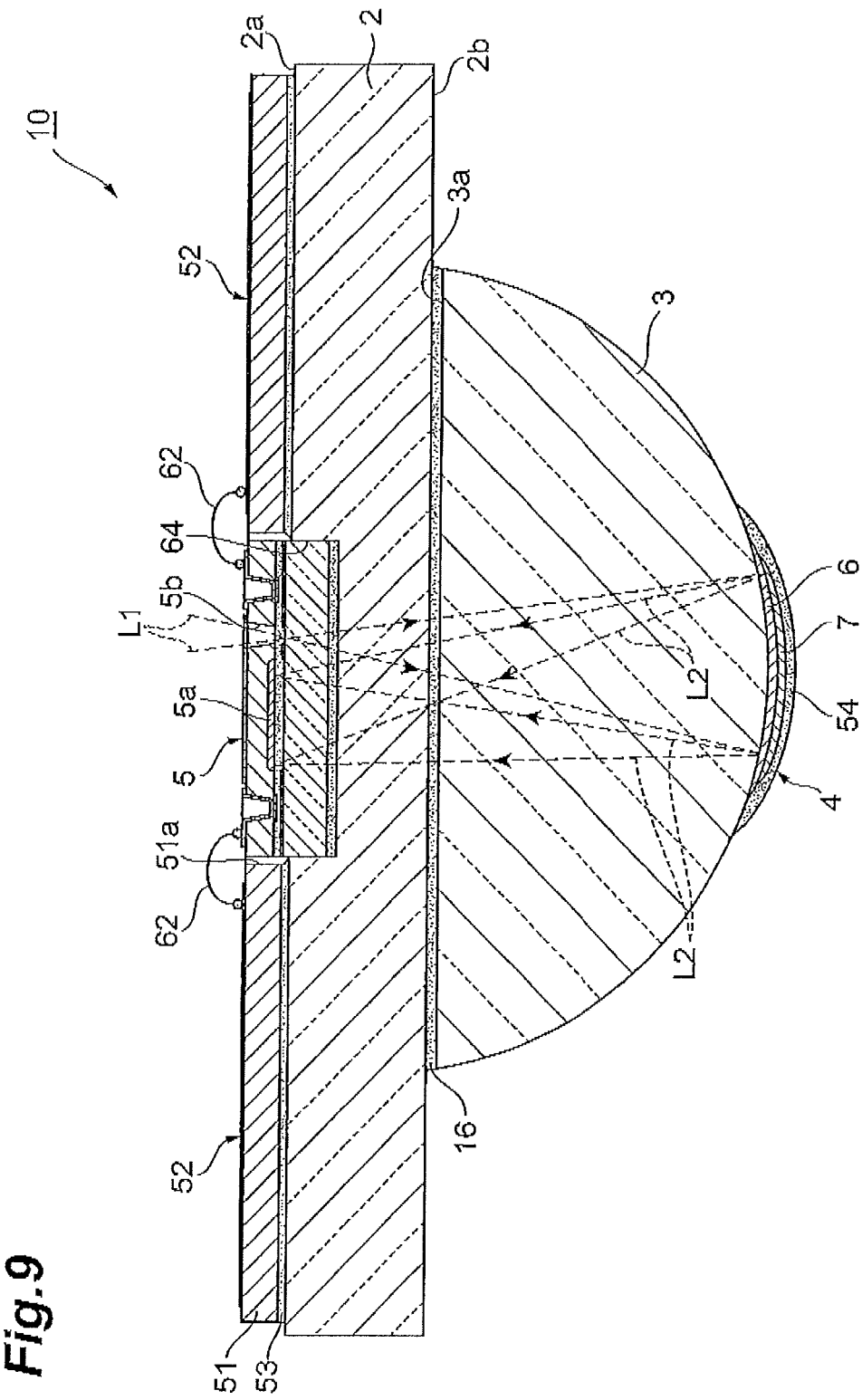
[FIG. 9] is a sectional view taken along the line IX-IX of FIG. 8.

FIG. 8 is a plan view of the second embodiment of the spectral module in accordance with the present invention, while FIG. 9 is a sectional view taken along the line IX-IX of FIG. 8. As illustrated in FIGS. 8 and 9, this spectral module 10 comprises a substrate (main unit) 2 for transmitting light L1 incident thereon from the front face (one surface) 2a side, a lens unit (main unit) 3 for transmitting the light L1 incident on the substrate 2, a spectroscopic unit 4 for reflecting and spectrally resolving the light L1 incident on the lens unit 3, and a photodetector 5 for detecting light L2 reflected by the spectroscopic unit 4.

The substrate 2 is formed into an rectangular plate, while a wiring board 51 shaped like an rectangular plate formed with an opening 51a having an rectangular cross section in which the photodetector 5 is arranged is bonded to the front face 2a of the substrate 2 with a resin agent 53. The wiring board 51 is provided with a wiring pattern 52 made of a metal material. The wiring pattern 52 has a plurality of pad parts 52a arranged about the opening 51a, a plurality of pad parts 52b arranged at both end portions in the longitudinal direction of the wiring board 51, respectively, and a plurality of connection parts 52c for connecting the corresponding pad parts 52a and 52b to each other.

Figure 10:
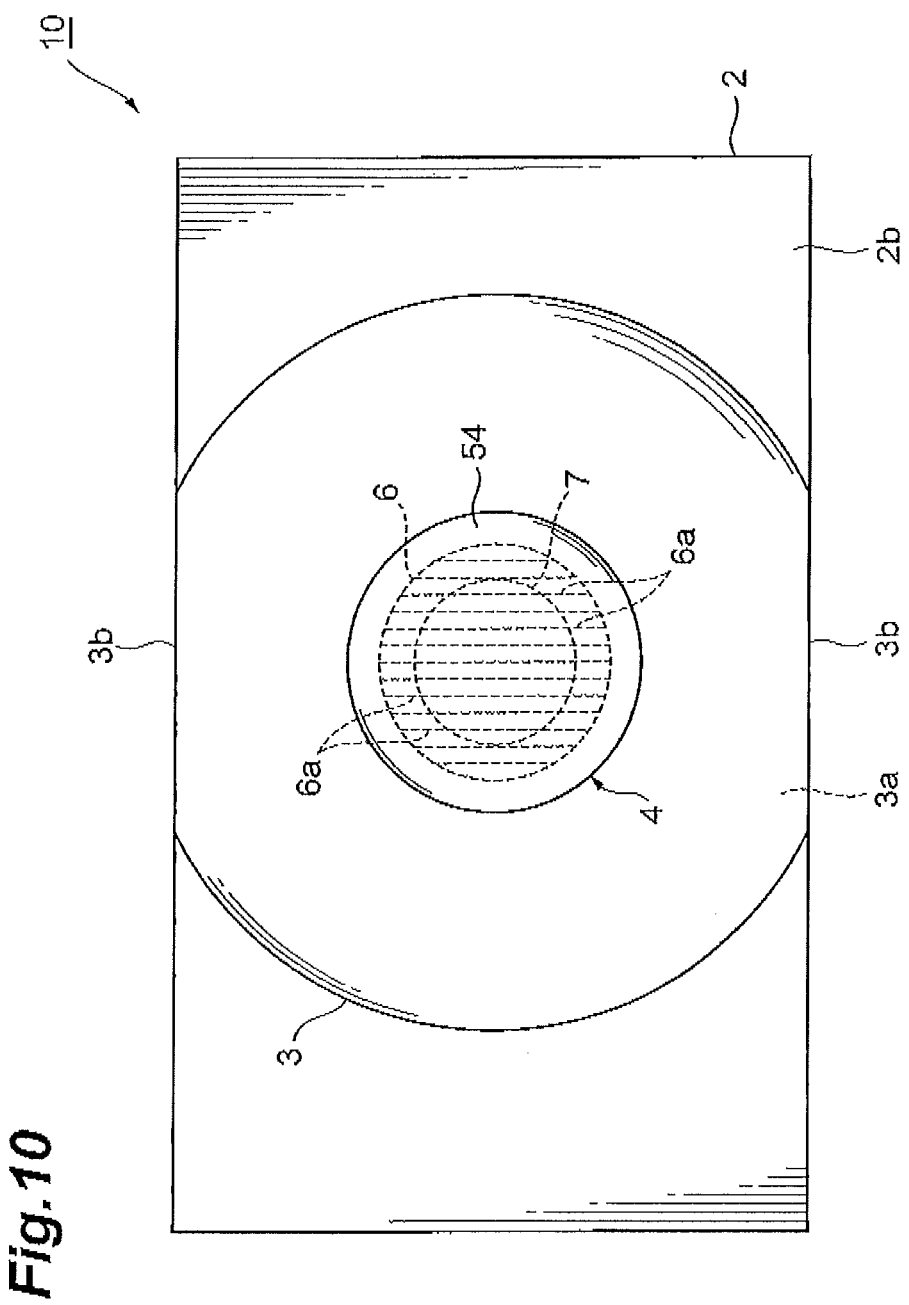
[FIG. 10] is a bottom plan view of the spectral module of FIG. 8.

FIG. 10 is a bottom plan view of the spectral module of FIG. 8. As illustrated in FIGS. 9 and 10, the lens unit 3 is bonded to the rear face the other surface) 2b of the substrate 2 with an optical resin agent 16 which transmits the light L1, L2 while using outer edge portions of the substrate 2 such as corner portions and side portions thereof as reference units. Here, the spectroscopic unit 4 is positioned with respect to the lens unit 3 with a high precision, whereby the outer edge portions of the substrate 2 serve as reference units for positioning the spectroscopic unit 4 with respect to the substrate 2.

The spectroscopic unit 4 is a reflection type grating having a diffracting layer 6 formed on the outer surface of the lens unit 3, a reflecting layer 7 formed on the outer surface of the diffracting layer 6, and a passivation layer 54 which covers the diffracting layer 6 and reflecting layer 7. The diffracting layer 6 is formed by aligning a plurality of grating grooves 6a in a row longitudinally of the substrate 2, while the extending direction of the grating grooves 6a substantially coincides with a direction substantially orthogonal to the longitudinal direction of the substrate 2.

As illustrated in FIGS. 8 and 9, the photodetector 5 is formed into an rectangular plate, while the surface of the photodetector 5 on the spectroscopic unit 4 side is formed with a light detecting unit 5a. The light detecting unit 5a is a CCD image sensor, a PD array, a CMOS image sensor, or the like, in which a plurality of channels are arranged in a row in a direction (i.e., the direction of the row of the grating grooves 6a) substantially orthogonal to the extending direction of the grating grooves 6a of the spectroscopic unit 4.

The photodetector 5 is also formed with a light transmitting hole 5b, disposed in parallel with the light detecting unit 5a in the channel arrangement direction, for transmitting the light L1 proceeding to the spectroscopic unit 4. The light transmitting hole 5b, which is a slit extending in a direction substantially orthogonal to the longitudinal direction of the substrate 2, is formed by etching or the like while being positioned with respect to the light detecting unit 5a with a high precision.

Figure 11:
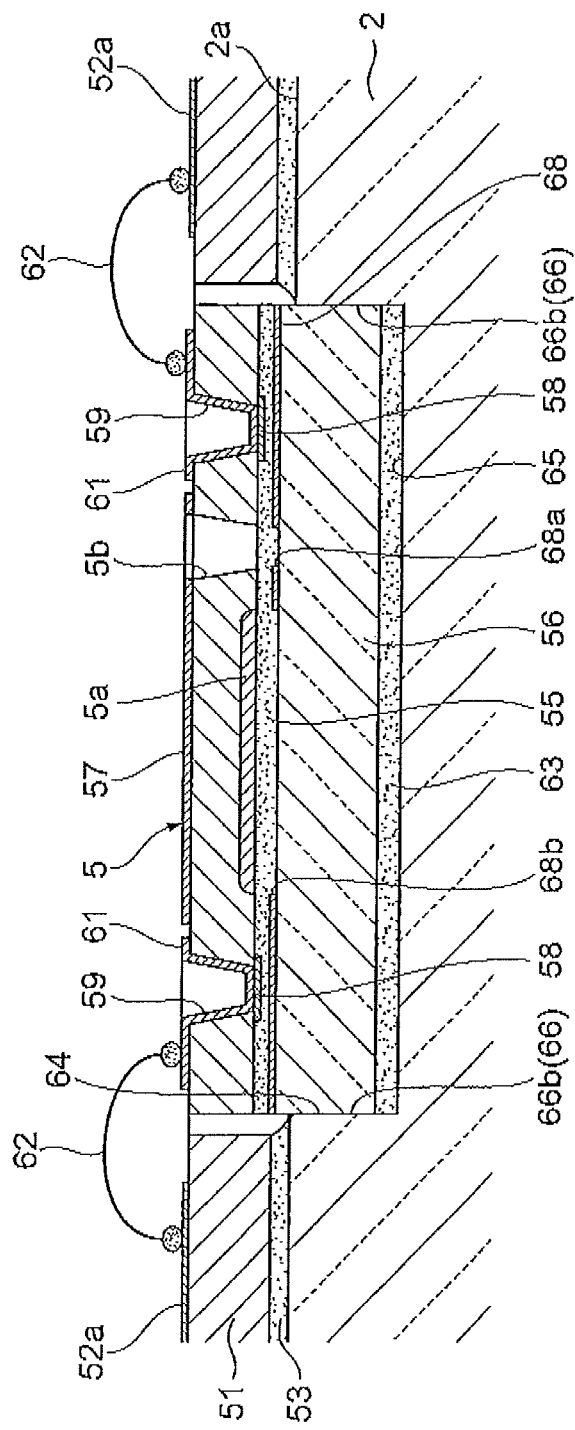
[FIG. 11] is an enlarged sectional view of a main part of the spectral module of FIG. 9.

FIG. 11 is an enlarged sectional view of a main part of the spectral module of FIG. 9. As illustrated in FIG. 11, the photodetector 5 has a light transmitting plate 56 bonded to the surface of the photodetector 5 on the spectroscopic unit 4 side with an optical resin agent 55, which transmits the light L1, L2, and a light shielding film 57 formed on the surface of the photodetector 5 opposite from the spectroscopic unit 4 in a part opposing the light detecting unit 5a. The light transmitting plate 56 covers the light detecting unit 5a and light transmitting hole 5b. The light shielding film 57 blocks the light L1 that is going to proceed to the spectroscopic unit 4 without passing through the light transmitting hole 5b or the light L1 that is going to be directly incident on the light detecting unit 5a, As with the light shielding film 57, the wiring board 51 functions to block the light L1 that is going to proceed to the spectroscopic unit 4 without passing through the light transmitting hole 5b.

A plurality of electrodes 58 are formed on the surface of the photodetector 5 on the spectroscopic unit 4 side, while the surface of the photodetector 5 on the side opposite from the spectroscopic unit 4 is formed with a plurality of terminal electrodes 61 connected to their corresponding electrodes 58 with through-electrodes 59. The terminal electrodes 61 are connected to their corresponding pad parts 52a of the wiring board 51 with respective wires 62. Hence, electric signals generated in the light detecting unit 5a are taken out through the electrodes 58, through-electrodes 59, terminal electrodes 61, pad parts 52a, connection parts 52c, and pad parts 52b.

Figure 12:
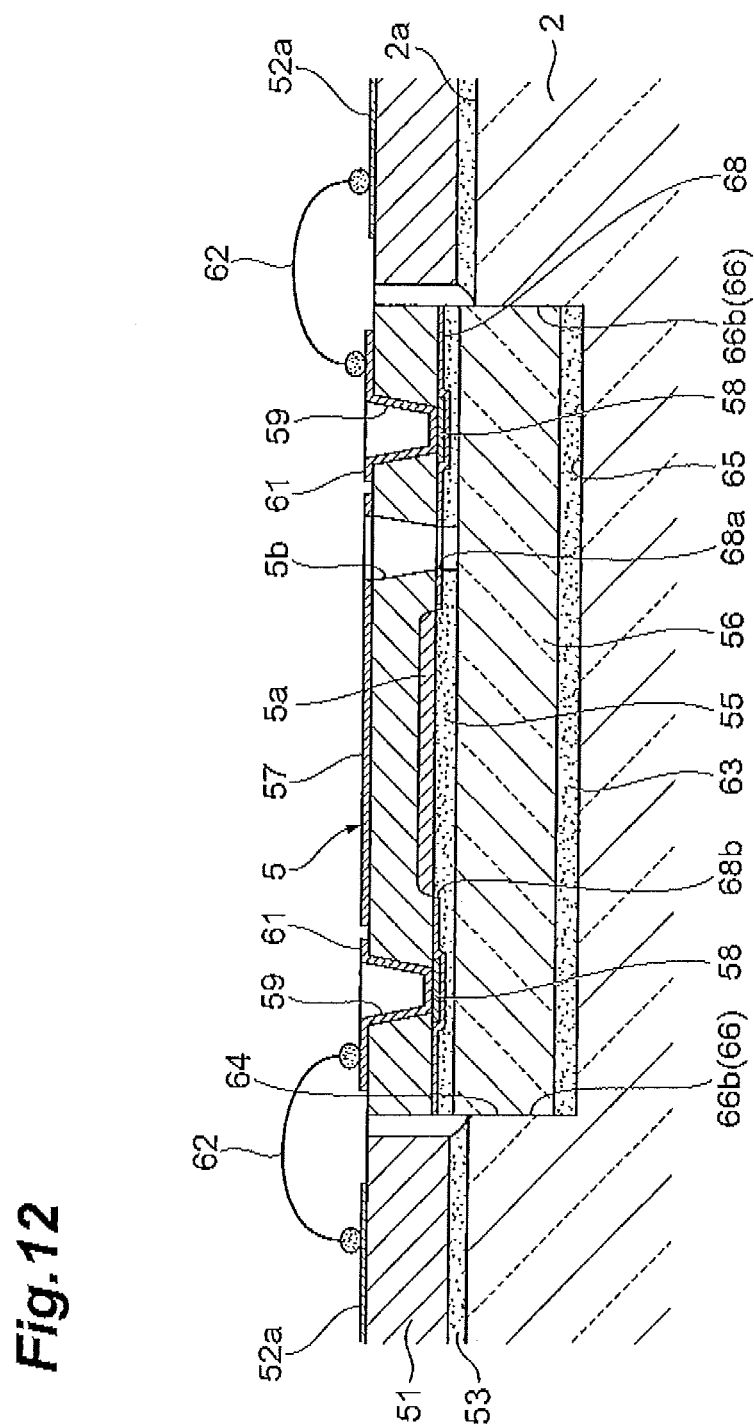
[FIG. 12] is an enlarged sectional view of a main part of still another embodiment of the spectral module in accordance with the present invention.

A light absorbing layer 68 is formed on the surface of the light transmitting plate 56 on the photodetector 5 side. The light absorbing layer 68 is formed with a light transmitting hole 68a at a position opposing the light transmitting hole 5b of the photodetector 5 so as to transmit the light L1 proceeding to the spectroscopic unit 4 and a light transmitting hole 68b at a position opposing the light detecting unit 5a of the photodetector 5 so as to transmit the light L2 proceeding to the light detecting unit 5a. The light absorbing layer 68 is patterned into a predetermined form and integrally shaped by CrO, a multilayer film containing CrO, a black resist, or the like. The light absorbing layer 68 may be formed on the surface of the photodetector 5 on the spectroscopic unit 4 side as illustrated in FIG. 12.

As illustrated in FIG. 11, the front face 2a of the substrate 2 is provided with a recess 64 having an rectangular cross section adapted to mate with the photodetector 5 through an optical resin agent 63 which transmits the light L1, L2. The recess 64 comprises a bottom face 65 substantially parallel to the front face 2a of the substrate 2 and a side wall 66 substantially perpendicular to the bottom face 65 and is fowled by etching such as to have a predetermined positional relationship with the outer edge portions of the substrate 2 serving as a reference unit. The photodetector 5 projects from the front face 2a of the substrate 2 while mating with the recess 64.

Figure 13:
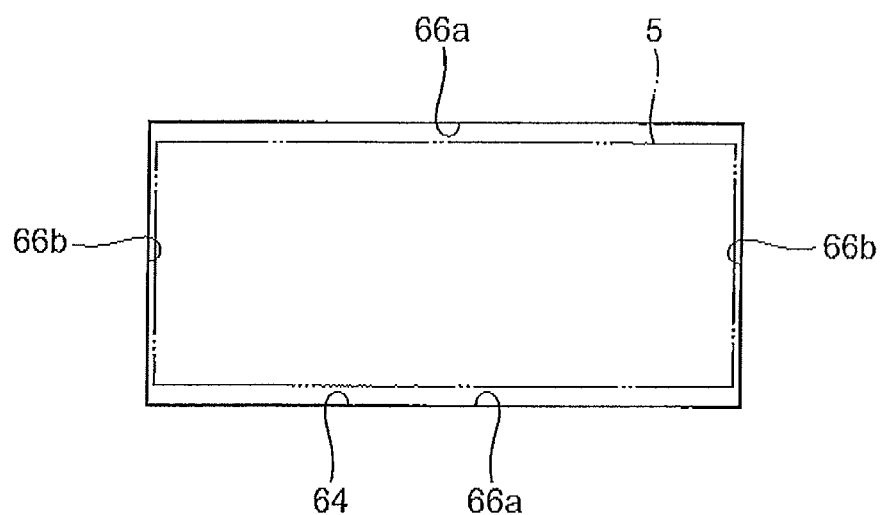
[FIG. 13] is a view illustrating the relationship between a photodetector and a recess in the spectral module of FIG. 8.

FIG. 13 is a view illustrating the relationship between the photodetector and recess in the spectral module of FIG. 8. As illustrated in FIG. 13, the recess 64 is provided with side walls (third mating sections) 66a adapted to mate with the photodetector 5 in the extending direction of the grating grooves 6a of the spectroscopic unit 4 and side walls (fourth mating sections) 66b adapted to mate with the photodetector 5 in a direction substantially orthogonal to the extending direction of the grating grooves 6a of the spectroscopic unit 4. The gap between the photodetector 5 and each side wall 66b is smaller than that between the photodetector 5 and each side wall 66a.

A method of manufacturing the above-mentioned spectral module 10 will be explained.

First, the spectroscopic unit 4 is formed on the lens unit 3. Specifically, a light transmitting master grating inscribed with a grating corresponding to the diffracting layer 6 is pressed against a replicating optical resin dropped near the vertex of the lens unit 3. Subsequently, in this state, the replicating optical resin is hardened by irradiation with light, preferably followed by heat curing for stabilization, so as to form the diffracting layer 6 having a plurality of grating grooves 6a. Thereafter, the master grating is released therefrom, Al, Au, or the like is vapor-deposited on the outer surface of the diffracting layer 6, so as to form the reflecting layer 7, and $MgF_2$ or the like is vapor-deposited on the outer surface of the diffracting layer 6 and reflecting layer 7, so as to form the passivation layer 54.

On the other hand, the substrate 2 is prepared and, while employing outer edge portions of the substrate 2 such as corner portions and side portions thereof as reference units, the recess 64 is formed in the front face 2a of the substrate 2 by photolithography and etching utilizing a double-sided alignment and exposure system such as to have a predetermined positional relationship with the reference units.

While using outer edge portions of the substrate 2 such as corner portions and side portions thereof as reference units, the lens unit 3 formed with the spectroscopic unit 4 is bonded to the rear face 2b of the substrate 2 with the optical resin agent 16. Thereafter, the optical resin agent 63 is applied to the recess 64 of the substrate 2, and the photodetector 5 having the light transmitting plate 56 attached thereto is mated with the recess 64. Then, the optical resin agent 63 is hardened by irradiation with light, and the photodetector 5 is mounted to the substrate 2.

Subsequently, the wiring board 51 is bonded to the front face 2a of the substrate 2 with the resin agent 53. Then, the terminal electrodes 61 of the photodetector 5 and their corresponding pad parts 52a of the wiring board 51 are connected to each other through the wires 62, so as to yield the spectral module 10.

As explained in the foregoing, since the recess 64 has a predetermined positional relationship with the outer edge portions of the substrate 2 serving as reference units for positioning the spectroscopic unit 4 with respect to the substrate 2 in the spectral module 10, the photodetector 5 is positioned with respect to the substrate 2 when the photodetector 5 is simply mated with the recess 64. Here, the lens unit 3 formed with the spectroscopic unit 4 is positioned with respect to the substrate 2 by the outer edge portions of the substrate 2 serving as reference units, whereby alignment is achieved between the spectroscopic unit 4 and photodetector 5. Also, the gap between the side wall 66 of the recess 64 and the photodetector 5 in a direction substantially orthogonal to the extending direction of the grating grooves 6a of the spectroscopic unit 4 is smaller than that in the extending direction of the grating grooves 6a of the spectroscopic unit 4. Therefore, the alignment between the lens unit 3 and photodetector 5 is effected precisely in a direction substantially orthogonal to the extending direction of the grating grooves 6a, so that the light L2 spectrally resolved by the spectroscopic unit 4 can accurately be made incident on the photodetector 5. Further, the photodetector 5 has an rectangular form, so as to make the gap between the photodetector 5 and the side wall 66 of the recess 64 longer and the distance to the gap shorter in the extending direction of the grating grooves 6a, whereby the excess of resin and air can be released effectively when bonding the photodetector 5 to the substrate 2 with the optical resin agent 63. Thus, the spectral module 10 achieves so-called passive alignment, which can make it easy to assemble while keeping reliability.

In the spectral module 10, the photodetector 5 projects from the front face 2a of the substrate 2 while mating with the recess 64. This can not only make it easier to mate the photodetector 5 with the recess 64 disposed in the front face 2a of the substrate 2, but also reliably press the photodetector 5 against the bottom face 65 of the recess 64, thereby securely releasing the excess of resin and air.

In the spectral module 10, the photodetector 5 is provided with the light transmitting hole 5b that transmits the light L1 proceeding to the spectroscopic unit 4. This can achieve passive alignment of the light transmitting hole 5b with respect to the spectroscopic unit 4 and photodetector 5.

The present invention is not limited to the above-mentioned second embodiment.

Figure 14:
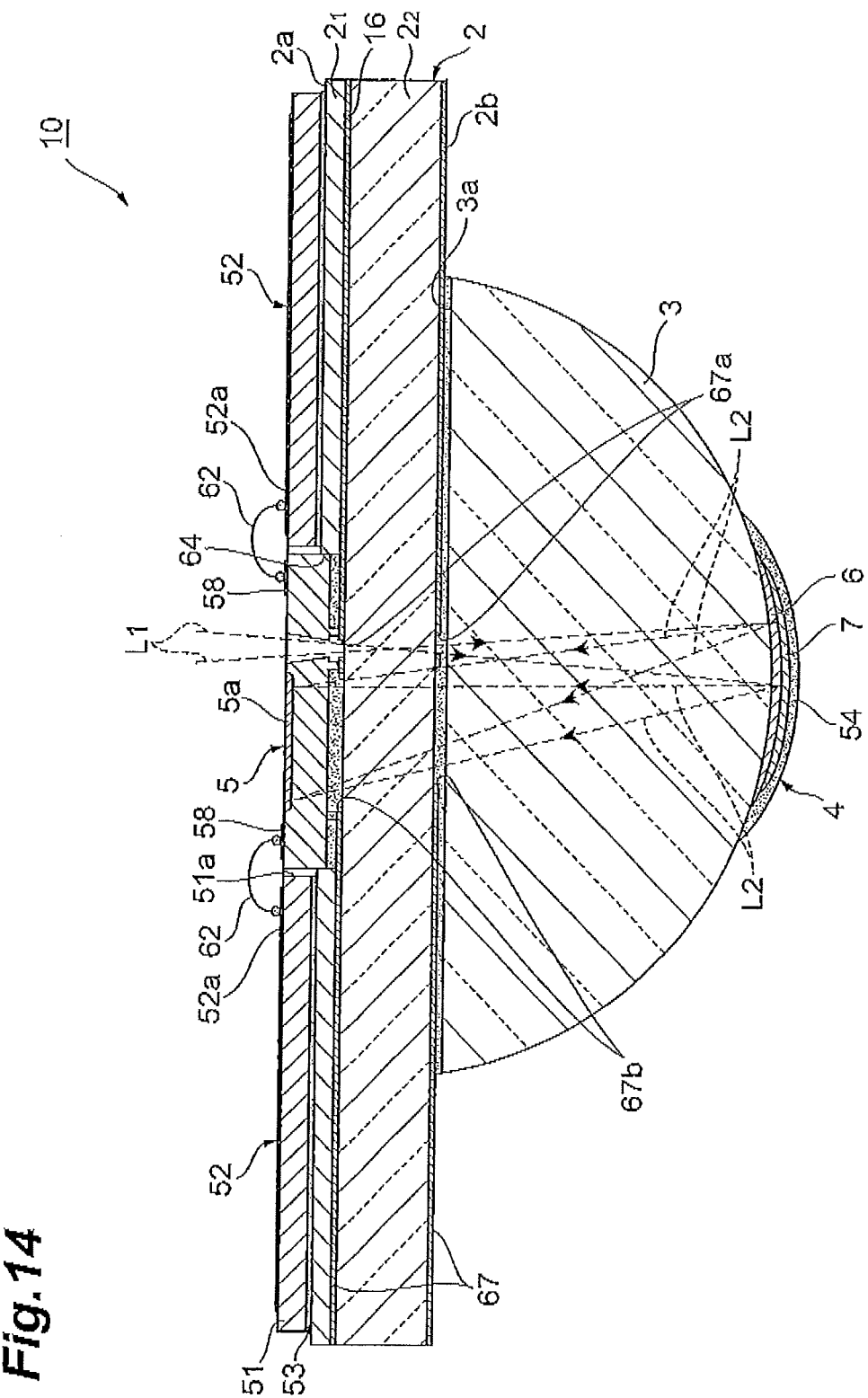
[FIG. 14] is a sectional view of still another embodiment of the spectral module in accordance with the present invention.

For example, as illustrated in FIG. 14, the substrate 2 may be constructed by bonding a plurality of layers of substrates together. When the substrate 2 is constructed by bonding two layers of substrates $2_1$, $2_2$ to each other with the optical resin agent 16 by way of example, the substrate $2_1$ arranged on the side opposite from the spectroscopic unit 4 may be provided with an opening having an rectangular cross section, so as to form the recess 64 of the substrate 2.

A light absorbing layer 67 having a light transmitting hole 67a for transmitting the light L1 proceeding to the spectroscopic unit 4 and a light transmitting hole 67b for transmitting the light L2 proceeding to the light detecting unit 5a of the photodetector 5 may be formed between the substrates $2_1$, $2_2$ adjacent to each other or between the substrate $2_2$ and lens unit 3. This structure can restrict widening advancing light so as to make it reach a desirable region and effectively inhibit stray light from entering the photodetector 5.

Examples of the material for the light absorbing layer 67 include black resists, colored resins (e.g., silicone, epoxy, acrylic, urethane, polyimide, and composite resins) containing fillers (such as carbon and oxides), metals such as Cr and Co and oxides thereof, their multilayer films, and porous ceramics and metals or metal oxides. The light transmitting holes 67a, 67b in the light absorbing layer 67 may have different sizes, whereby the optical NA can be adjusted.

As illustrated in FIG. 14, a so-called back-illuminated element may be employed as the photodetector 5. In this case, the electrodes 58 are located on the outer side together with the light detecting unit 5a and thus may be employed as terminal electrodes so as to be connected to the pad parts 52a of the wiring board 51 with the wires 62. The substrate 2 and lens unit 3 may be integrally formed by a mold, whereas the lens 3 and diffracting layer 6 may be integrally formed from a light transmitting low melting glass material for shaping a replica or the like. The recess 64 may be formed on the front face of the lens unit 3 without using the substrate 2 as a main unit.

Figure 15:
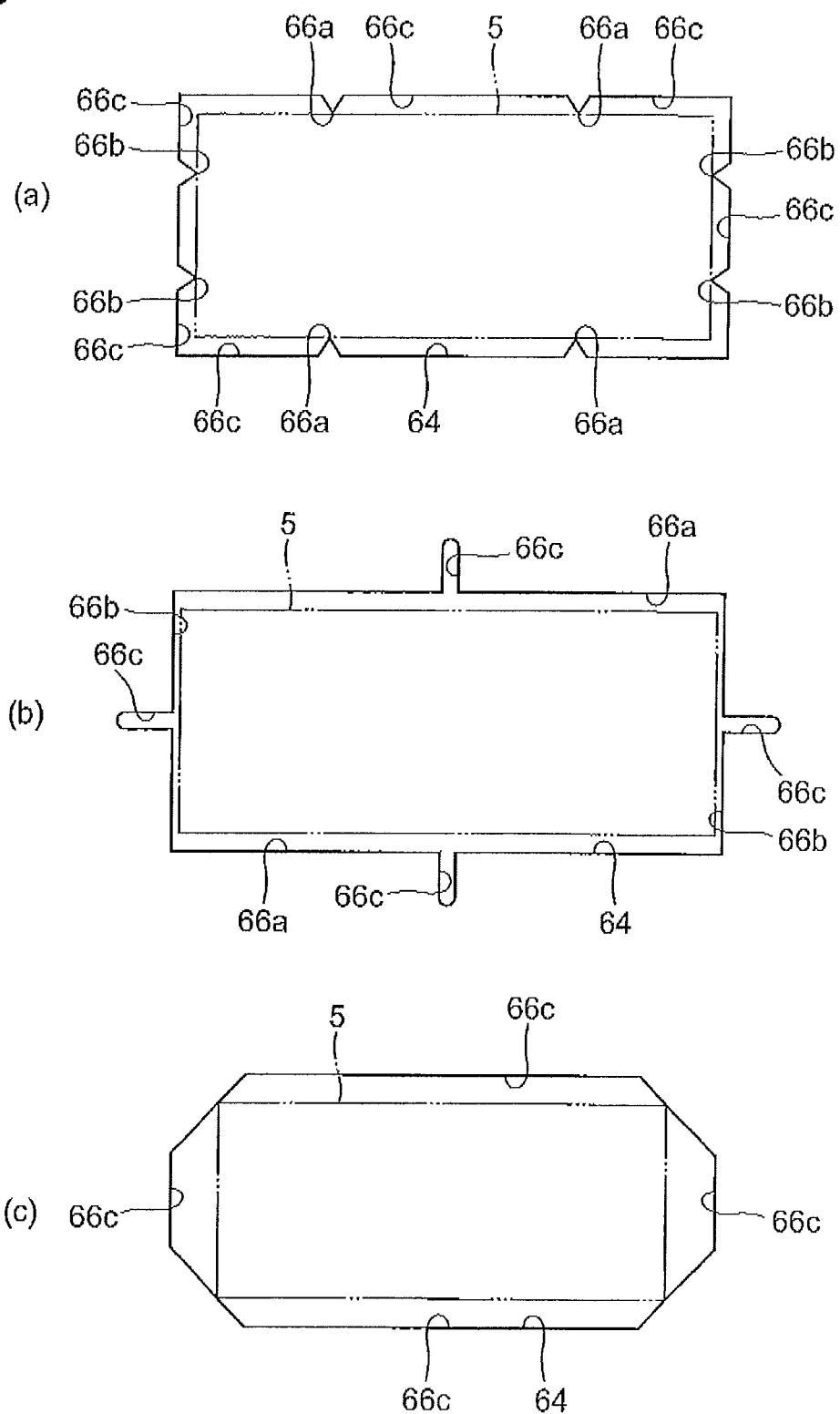
[FIG. 15] is a view illustrating relationships between the photodetector and recess in other embodiments of the spectral module in accordance with the present invention.

As illustrated in FIG. 15, the side wall 66 of the recess 64 adapted to mate with the photodetector 5 may have spaced sections 66c deviating from the photodetector 5. Such a structure can release the excess of resin and air more effectively through the gaps between the photodetector 5 and spaced sections 66c when bonding the photodetector 5 to the substrate 2 with the optical resin agent 63. This can suppress unevenness in the resin agent and occurrence of bubbles between the photodetector 5 and substrate 2.

Without being limited to the above-mentioned first and second embodiments, the present invention may be constructed such that the rear face 2b of the substrate 2 is provided with the recess 19, the lens unit 3 is mated with the recess 19 through the optical resin agent 16, the front face 2a of the substrate 2 is provided with the recess 64, and the photodetector 5 is mated with the recess 64 through the optical resin agent 63. In this case, by way of example, the recess 64 serves as a reference unit for positioning the photodetector 5 with respect to the substrate 2, while the recess 19 serves as a reference unit for positioning the spectroscopic unit 4 with respect to the substrate 2. Instead of forming the photodetector 5 with the light transmitting hole 5b for transmitting the light L1 proceeding to the spectroscopic unit 4, the wiring board or light shielding film may be provided therewith.

INDUSTRIAL APPLICABILITY

The present invention makes it possible to assemble a spectral module easily while keeping the reliability of the spectral module.

REFERENCE SIGNS LIST 1, 10 . . . spectral module; 2 . . . substrate (main unit); 2a . . . front face (one surface); 2b . . . rear face (the other surface); 3 . . . lens unit (light transmitting unit or main unit); 4 . . . spectroscopic unit; 5 . . . photodetector; 6a . . . grating groove; 16 . . . optical resin agent; 19 . . . recess; 22 . . . side wall (first and second mating sections); 63 . . . optical resin agent; 64 . . . recess; 66a . . . side wall (third mating section); 66b . . . side wall (fourth mating section)

The invention claimed is:
1. A spectral module comprising:
a substrate, having first and second surfaces, for transmitting light and for receiving light incident on the first surface;
a light transmitting unit having a third surface and a fourth surface, wherein the third surface receives light from the second surface of the substrate;
a spectroscopic unit, formed on the fourth surface of the light transmitting unit, for internally reflecting and spectrally resolving light incident from the second surface of the substrate, wherein the transmitting unit receives the spectrally resolved light internally reflected from the spectroscopic unit and transmits it back to the second surface of the substrate; and
a photodetector, disposed on the first surface of the substrate, for detecting the light spectrally resolved by the spectroscopic unit that is received from the light transmitting unit and transmitted through the substrate from the second to the first surface;
wherein the second surface is provided with a recess, adapted to mate with the light transmitting unit through an optical resin agent, having a predetermined positional relationship with a reference unit for positioning the photodetector with respect to the substrate;
wherein the recess is provided with a first mating section adapted to mate with the light transmitting unit in an extending direction of a grating groove of the spectroscopic unit and a second mating section adapted to mate with the light transmitting unit in a direction substantially orthogonal to the extending direction of the grating groove; and
wherein the second mating section and the light transmitting unit have a gap therebetween smaller than that between the first mating section and the light transmitting unit, and
wherein the components of the spectral module are configured and arranged so that light propagates through the system in the following way:
light incident on the first surface of the substrate is transmitted through the substrate to the second surface of the substrate;
light transmits from the second surface of the substrate into the light transmitting unit through the third surface of the light transmitting unit;
light transmits through the light transmitting unit and encounters the spectroscopic unit that is disposed on the fourth surface of the light transmitting unit, is internally reflected therefrom and thereby becomes spectrally resolved;

the spectrally resolved light propagates back through the light transmitting unit and enters the substrate through the second surface of the substrate; and the spectrally resolved light propagates through the substrate from the second to the first surface and is detected by the photo detector on the first side of the substrate.

2. A spectral module according to claim 1, wherein a side wall of the recess includes a spaced section deviating from the first and second mating sections and the light transmitting unit.

3. A spectral module according to claim 2, wherein the spaced section comprises a plurality of sections disposed so as to surround the light transmitting unit.

4. A spectral module comprising:

a substrate, having first and second surfaces, for transmitting light and for receiving light incident on the first surface;

a light transmitting unit having a third surface and a fourth surface, wherein the third surface receives light from the second surface of the substrate;

a spectroscopic unit, formed on the fourth surface of the light transmitting unit, for internally reflecting and spectrally resolving light incident from the second surface of the substrate, wherein the transmitting unit receives the spectrally resolved light internally reflected from the spectroscopic unit and transmits it back to the second surface of the substrate; and a photodetector, disposed on the first surface of the substrate, for detecting the light spectrally resolved by the spectroscopic unit that is received from the light transmitting unit and transmitted through the substrate from the second to the first surface;

wherein the second surface is provided with a recess having a predetermined positional relationship with a reference unit for positioning the photodetector with respect to the substrate; and wherein the light transmitting unit is mated with the recess, and wherein the components of the spectral module are configured and arranged so that light propagates through the system in the following way:

light incident on the first surface of the substrate is transmitted through the substrate to the second surface of the substrate;

light transmits from the second surface of the substrate into the light transmitting unit through the third surface of the light transmitting unit;

light transmits through the light transmitting unit and encounters the spectroscopic unit that is disposed on the fourth surface of the light transmitting unit, is internally reflected therefrom and thereby becomes spectrally resolved;

the spectrally resolved light propagates back through the light transmitting unit and enters the substrate through the second surface of the substrate; and the spectrally resolved light propagates through the substrate from the second to the first surface and is detected by the photo detector on the first side of the substrate.

5. A spectral module comprising:

a main unit having first and second surfaces for transmitting light and for receiving light incident on the first surface;

a spectroscopic unit, formed on the second surface of the main unit, for internally reflecting and spectrally resolving light incident from the first surface of the main unit; and a photodetector, disposed on the first surface of the main unit, for detecting the light internally reflected from and spectrally resolved by the spectroscopic unit;

wherein the first surface is provided with a recess, adapted to mate with the photodetector through an optical resin agent, having a predetermined positional relationship with a reference unit for positioning the spectroscopic unit with respect to the main unit;

wherein the recess is provided with a third mating section adapted to mate with the photodetector in an extending direction of a grating groove of the spectroscopic unit and a second mating section adapted to mate with the photodetector in a direction substantially orthogonal to the extending direction of the grating groove; and wherein the second mating section and the photodetector have a gap therebetween smaller than that between the first mating section and the photodetector.

6. A spectral module according to claim 5, wherein the photodetector has an elongated form such as to be longer in a direction substantially orthogonal to the extending direction of the grating groove than in the extending direction of the grating groove.

7. A spectral module according to claim 5, wherein the photodetector projects from the one surface while mating with the recess.

8. A spectral module according to claim 5, wherein the photodetector is provided with a light transmitting hole for transmitting light proceeding to the spectroscopic unit.

9. A spectral module comprising:

a substrate, having first and second surfaces, for transmitting light and for receiving light incident on the first surface;

a light transmitting unit having a third surface and a fourth surface, wherein the third surface receives light from the second surface of the substrate;

a spectroscopic unit, formed on the fourth surface of the light transmitting unit, for internally reflecting and spectrally resolving light incident from the second surface of the substrate, wherein the transmitting unit receives the spectrally resolved light internally reflected from the spectroscopic unit and transmits it back to the second surface of the substrate; and a photodetector, disposed on the first surface of the substrate, for detecting the light spectrally resolved by the spectroscopic unit that is received from the light transmitting unit and transmitted through the substrate from the second to the first surface;

wherein the components of the spectral module are configured and arranged so that light propagates through the system in the following way:

light incident on the first surface of the substrate is transmitted through the substrate to the second surface of the substrate;

light transmits from the second surface of the substrate into the light transmitting unit through the third surface of the light transmitting unit;

light transmits through the light transmitting unit and encounters the spectroscopic unit that is disposed on the fourth surface of the light transmitting unit, is internally reflected therefrom and thereby becomes spectrally resolved;

the spectrally resolved light propagates back through the light transmitting unit and enters the substrate through the second surface of the substrate; and the spectrally resolved light propagates through the substrate from the second to the first surface and is detected by the photo detector on the first side of the substrate.

* * * * *